United States Patent

[11] 3,550,608

| [72] | Inventor | Irvin D. Johnson<br>Gendorf, Germany |
|---|---|---|
| [21] | Appl. No. | 734,687 |
| [22] | Filed | June 5, 1968 |
| [45] | Patented | Dec. 29, 1970 |
| [73] | Assignee | Marathon Oil Company<br>Findlay, Ohio<br>a corporation of Ohio |

[54] FLUID INJECTION CONTROL LOOP AND PEAK AMPLITUDE CONVERTER
9 Claims, 4 Drawing Figs.

| [52] | U.S. Cl. | 137/93,<br>73/23.1, 307/235 |
|---|---|---|
| [51] | Int. Cl. | G05d 11/035,<br>G01n 31/08 |
| [50] | Field of Search | 137/88, 93;<br>73/23.1 |

[56] References Cited
UNITED STATES PATENTS

| 3,057,184 | 10/1962 | Spracklen | 73/23.1 |
| 3,448,291 | 6/1969 | Burk et al. | 73/23.1X |

*Primary Examiner*—Robert G. Nilson
*Attorneys*—Joseph C. Herring, Richard C. Willson, Jr. and Jack L. Hummel

ABSTRACT: The content of a chemical in a reaction mixture is controlled automatically by opening a feed valve to the reaction chamber for a time inversely proportional to the amount of the chemical detected in the reaction chamber during a sample time. The chamber contents are periodically sampled and fed to a chromatograph. The peak measure of the chromatograph during each sample period is electronically detected. The difference between the chemical set point and the sample chemical peak is a measure of the amount of chemical which should be added. The latter difference, in the form of a voltage, is converted into a proportional time duration pulse which opens the feed valve to the reaction chamber.

PATENTED DEC 29 1970        3,550,608

INVENTOR
IRVIN D. JOHNSON
BY
Sughrue, Rothwell, Mion, Zinn & Macpeak
ATTORNEYS

INVENTOR
IRVIN D. JOHNSON

FLUID INJECTION CONTROL LOOP AND PEAK AMPLITUDE CONVERTER

BACKGROUND OF THE INVENTION

The invention is in the field of electronic control means for controlling the flow of a fluid, and also in the field of electronic converters in a control means for converting a peak amplitude signal into a time duration signal.

When chemical reactions are carried out, it is often necessary to know the amount of a particular reactant within a reaction chamber. This knowledge is necessary in order to insure that the proper amount of reactant is entered into the chamber. Some crude methods for determining the amount of reactant in a mixture are by feel, color, taste or smell. Another more sophisticated prior art method includes the use of a chromatograph in combination with a memory amplifier or mechanical servo. The chromatograph, as is well known, measures the amount of a selected chemical in a gas sample, and the memory amplifier or mechanical servo holds the peak of the measurement until the next measurement comes along a few minutes later. This type of measurement requires a linear control valve and other equipment which makes this method expensive.

Electronic apparatus for detecting the peak amplitude of a varying input voltage and for converting peak amplitude into a time duration voltage are known in the art. However, electronic apparatus of the latter type would not be suitable in a fluid control loop due to the fact that the peak amplitude is inversely proportional rather than proportional to the amount of the fluid which should be passed through a valve controlled by the time duration pulse.

SUMMARY

In accordance with the present invention, a control means including a chromatograph and a novel peak picker and amplitude to time converter, is provided for controlling the on-off time of a valve which connects a source of fluid to a reaction chamber. Under control of a timer, a gas sample from the reaction chamber is provide to a chromatograph which includes a retransmitting slide wire. The retransmitting slide wire provides a voltage wave form having a peak amplitude which is proportional to the amount of the fluid to be measured in the sample. The peak amplitude is detected by a peak picker and a voltage is created which is dependent upon the difference between the peak amplitude and a preset voltage amplitude which may represent the desired amount of the fluid in each sample. The voltage will have one polarity if the amplitude indicates that the fluid content is greater than the amount required and an opposite polarity if the peak amplitude indicates that the amount of fluid in the sample is less than the amount required. If the voltage has the latter mentioned polarity, its magnitude is converted into a time duration pulse which opens the a valve connecting the fluid source to the reaction chamber. Thus, the amount of time the valve is open is proportional to the difference between the peak voltage amplitude and the preset voltage amplitude, or stated otherwise, is inversely proportional to the detected peak amplitude.

In the peak picker and amplitude-to-time converter combination, the slide wire output voltage is applied to a first capacitor which follows the rising amplitude of the voltage. As the slide wire voltage starts to decrease, a relay is energized which operates to disconnect a second storage capacitor from the peak picker and connect it to the amplitude-to-time converter. The latter capacitor, when connected to the peak picker, is connected in such a manner that it has a reference voltage applied to one side thereof and the slide wire voltage corresponding to the measured sample connected to the other side. At the time that the capacitor is switched, the latter voltage will represent the peak amplitude of the slide wire voltage. The reference voltage represents some preset level proportional to the amount of fluid which should be in each detected sample of the gas. The voltage across the second storage capacitor, being the aforementioned difference voltage, is provided to a differential transistor connection which provides a pulse of output current for a time proportional to the voltage on the latter mentioned capacitor. The current pulse is further amplified and applied to a relay coil which operates to open the valve connecting the fluid source to the reaction chamber.

DETAILED DESCRIPTION OF THE DRAWINGS

The specific embodiment of the present invention will be described in connection with the reaction of bisulfonite and olefins in a reaction chamber to form alkane sulfonates. Specifically, the percentage or amount of oxygen in the reaction chamber is controlled. Although the control apparatus of the present invention is described in connection with the latter reaction, it will be apparent to anyone of ordinary skill in the art that the invention will operate with other reactions to control other fluids and that the control of oxygen flow is not intended to be in any way limiting to the invention.

Figure 1:
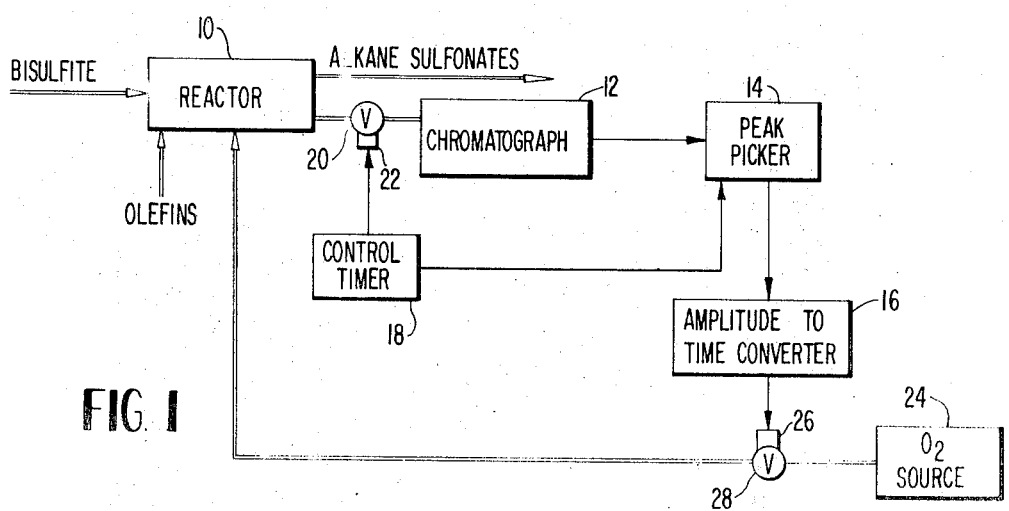
FIG. 1 is a block diagram of a preferred embodiment of the fluid injection control loop in accordance with the present invention.

Referring to FIG. 1, there is shown a reactor 10 in which bisulfite and olefins are to be reacted to produce alkane sulfonates. The control apparatus controls the amount of oxygen in the reactor 10 by opening the valve 28 between the source of oxygen 24 and the reactor 10. As illustrated in FIG. 1, the control apparatus includes a control timer 18, a chromatograph 12 with a retransmitting slide wire, a peak picker 14, an amplitude to time converter 16, solenoid controlled valves 20 and 28, and solenoids or relays 22 and 26.

The operation of the control apparatus of FIG. 1 is as follows: Periodically, control timer 18 energizes the sample valve solenoid 22 to open sample valve 20 thereby passing a gas sample of the reactor contents to chromatograph 12. The chromatograph 12 may be a standard chromatograph having a recorder with a retransmitting slide wire. The pointer or contact of the retransmitting slide wire moves upward with an increase of oxygen detected in the sample. Thus, for each sample there is a peak of the point of movement which represents the oxygen content within the sample. The slide wire contact is connected to a voltage divider or resistor across which a potential is applied to provide an output voltage wave form having a peak of voltage magnitude proportional to the oxygen content of the sample. The peak picker 14 detects the time at which the oxygen peak in the chromatograph 12 occurs and at that time transfers to the amplitude-to-time converter 16 a voltage which is dependent upon the peak voltage picked off by the pointer on the slide wire of chromatograph 12. The latter voltage may be a measure of the difference between the peak voltage and a set point voltage representing the desired oxygen content of a sample. Thus, the dependent voltage transferred to the amplitude-to-time converter 16 will be inversely proportional to the peak voltage detected by peak picker 14. The amplitude-to-time converter 16 converts the input voltage amplitude into a time duration pulse of current which energizes solenoid 26 to open valve 28. In this manner, the higher the oxygen peak in the sample injected into the chromatograph 12, the smaller the amount of time that valve 28 is open and vice versa. Thus, there is an inverse proportionality between the peak amplitude and the valve opening. As will be described more fully hereafter, the above described dependent voltage amplitude is stored on a commutating capacitor which is controlled by a relay $K_1$, illustrated in FIG. 3. The control input from control timer 18 to peak picker 14 energizes relay $K_1$ a fixed time following the opening of valve 20.

Figure 2:
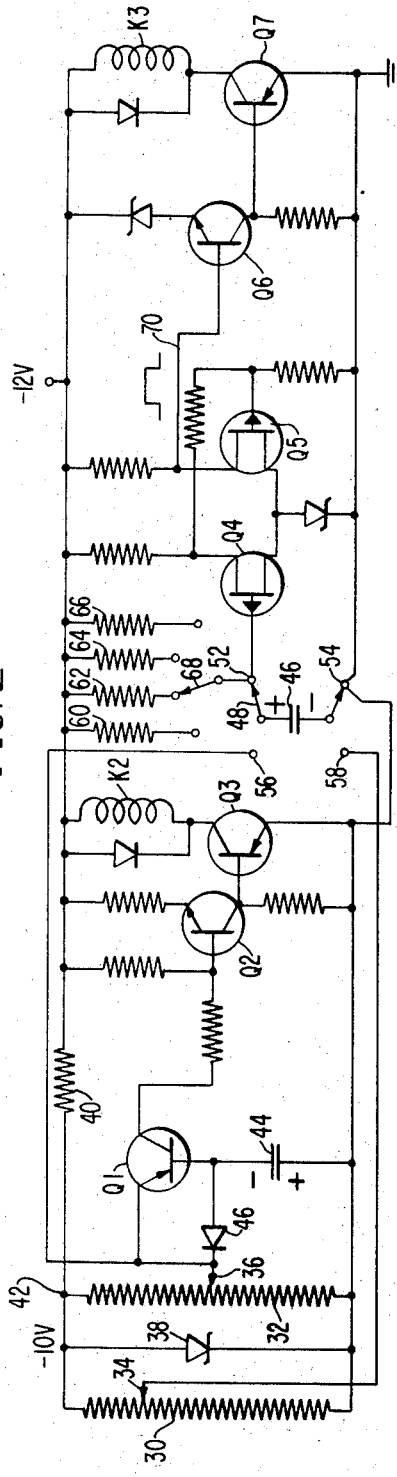
FIG. 2 is a schematic diagram of a preferred embodiment of a peak picker and amplitude-to-time converter in accordance with the present invention.

Referring to FIG. 2 which shows a combination of peak picker and amplitude-to-time converter, pointer 36 represents the pointer on the retransmitting slide wire of the chromatograph 12. The pointer 36 is movable and goes upward toward terminal 42 with an increase in oxygen. An additional voltage divider 30 and an adjustable pointer 34 are also provided. The peak picker comprises basically a storage capacitor 44, a diode 46, a transistor $Q_1$, current amplifying transistors $Q_2$ and $Q_3$, and relay coil $K_2$. The amplitude-to-time converter comprises basically a multivibrator composed of a pair of electronic valve means such as field effect transistors $Q_4$ and $Q_5$, current multiplying transistors $Q_6$ and $Q_7$, and relay coil $K_3$. A commutating capacitor 46 is connected during alternate periods to the input voltages from the slide wire pointers and to the amplitude-to-time converter by a double-pole, double-throw switch comprising movable arms 48 and 50, and stationary terminals 56, 58 and 52, 54. The double-pole, double-throw switch is under the control of relay $k_1$ (shown in FIG. 3) in a manner to be described more fully hereafter.

The operation of the circuit shown in FIG. 2 is as follows. A regulated voltage source (not shown) provides −12 volts across the circuit, and the Zener diode 38 in combination with resistor 40 reduces the voltage magnitude at terminal 42 to −10 volts. Pointer 34 may be moved to any position on voltage divider 30 which represents the oxygen set point, the higher the voltage magnitude, the higher the oxygen set point. Before a peak comes off the chromatograph, the contact 36 of the slide wire is near the bottom end of the slide wire and thus in the bottom end of voltage divider 32. When a peak starts occurring, the slider contact 36 moves up the voltage divider 32 increasing the negative charge flowing into capacitor 44 via diode 46. The voltage stored on diode 44 will be essentially the same as that picked off the voltage divider 32 by contact 36. During this time, transistor $Q_1$ will be nonconducting, relay $K_2$ will be deenergized and commutating capacitor 46 will be connected to terminals 56 and 58 which in turn are connected to the movable contacts 36 and 34. It will be noted that as long as a voltage picked off by movable contact 36 remains below the set point voltage picked off by contact 34, the commutator 46 will contain a charge having the polarity indicated in the drawing, that is, a positive voltage thereacross. As the contact 36 moves up the scale, the amount of positive charge on commutating capacitor 46 decreases.

When the pointer reaches a peak and begins to come down the slide wire, the voltage on contact 36 begins to decrease in magnitude thus causing capacitor 44 to discharge through the base emitter terminal of transistor 1. The latter action turns on $Q_1$ providing an output current which is current multiplied by transistors $Q_2$ and $Q_3$ to energize relay $K_2$. Relay $K_2$, as will be described more fully hereafter, operates a switch which deenergizes relay $K_1$ thereby causing commutating capacitor 46 to be connected between stationary terminals 52 and 54. At this time, the voltage stored on commutating capacitor 46 will be a measure of the difference between the set point voltage and the peak detected voltage. As long as the peak voltage is less than the set point voltage, resulting from the oxygen content of the sample being less than the preset oxygen amount, capacitor 46 will have a positive charge stored thereon at the time of switching.

Capacitor 46 is discharged through one of the resistors 60 through 66 which is selected by a range selector switch 68 to control the range scale. From the time that capacitor 46 is connected to the input of field effect transistor $Q_4$ until the time that it discharges to a preestablished minimum level, field effect transistor $Q_4$ is cut off, field effect transistor $Q_5$ is turned on, and a pulse of output current on lead 70 is applied to the base of current amplifying transistor $Q_6$. The current pulse, having a duration proportional to the voltage amplitude stored on capacitor 46, is amplified by transistors $Q_6$ and $Q_7$ to energize relay $K_3$. As will be described more fully hereafter, relay $K_3$ controls a switch which causes the solenoid 26 (FIG. 1) to become energized and open valve 28.

The operation of the relays, switches and the timing control circuit will be described in connection with the schematic drawing of FIG. 3 and the timing diagram of FIG. 4. The timing control circuit comprises a motor, not shown, which may be any type of motor controlled by energizing the motor control coil 74. Followers 84, 86, and 88 are connected respectively to the switch arms of timing switches $T_1$, $T_2$ and $T_3$, and are in contact with the surfaces of rotatable cam members 78, 80, and 82, respectively. Each of the rotatable cam members is mechanically linked to the motor so that they rotate as the motor rotates. The source of each rotatable cam member is provided with a notch into which the follower will drop once every 360° of revolution to cause the corresponding switch arm of the timing switch to disengage the upper stationary terminal and a engage the lower stationary terminal. Relay coils $K_2$ and $K_3$ are the same coils illustrated in FIG. 2 and coils 22 and 26 are the same coils illustrated generally in FIG. 1. Relays $K_1$, $K_2$ and $K_3$, control switch arms 90, 92 and 93, respectively, in such a manner that a switch arm contacts the upper stationary terminal when the corresponding relay is deenergized and contacts the lower stationary terminal when the corresponding relay is energized. Relay $K_1$ also controls the double-pole, double-throw switch connected to the commutating capacitor 46 as shown in FIG. 2, such that when energized capacitor 46 is connected to terminals 56 and 58 and when deenergized capacitor 46 is connected to terminals 52 and 54.

Figure 3:
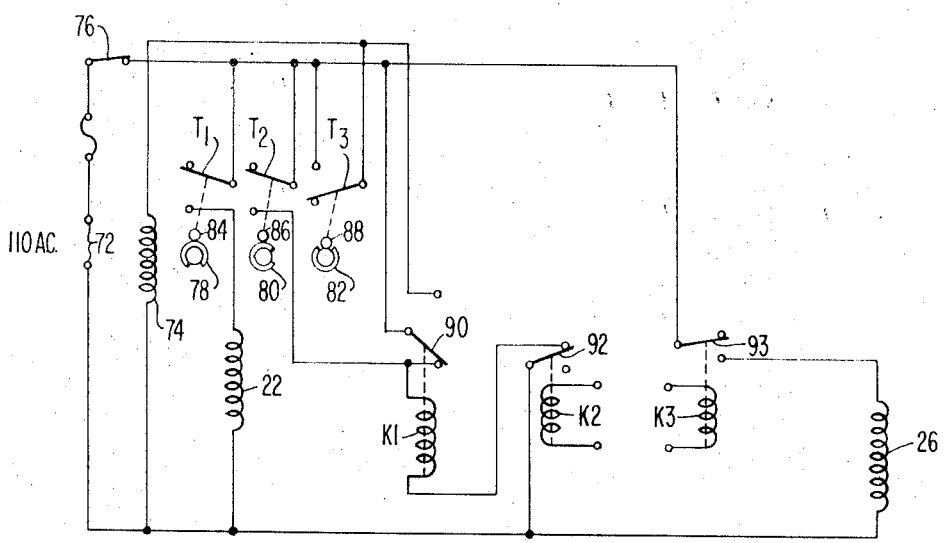
FIG. 3 is a schematic diagram of the connections between the relays of FIG. 2, the power supply, and the control timer indicated in FIG. 1.

The operation of the timing control circuitry and relays will be described from a starting point which assumes that the circuit switches are as shown in FIG. 3. The cam follower 88 is in the notch of cam member 82 thereby causing the switch arm of timer switch $T_3$ to contact the lower stationary terminal. As a result, coil 74 is deenergized and the motor is not operating. Relay $K_1$ is connected to the 110 volt AC power supply at terminals 72 via the power-on switch 76, switch arm 90, and switch arm 92. The action of switch arm 90 operates to latch on relay $K_1$.

Figure 4:
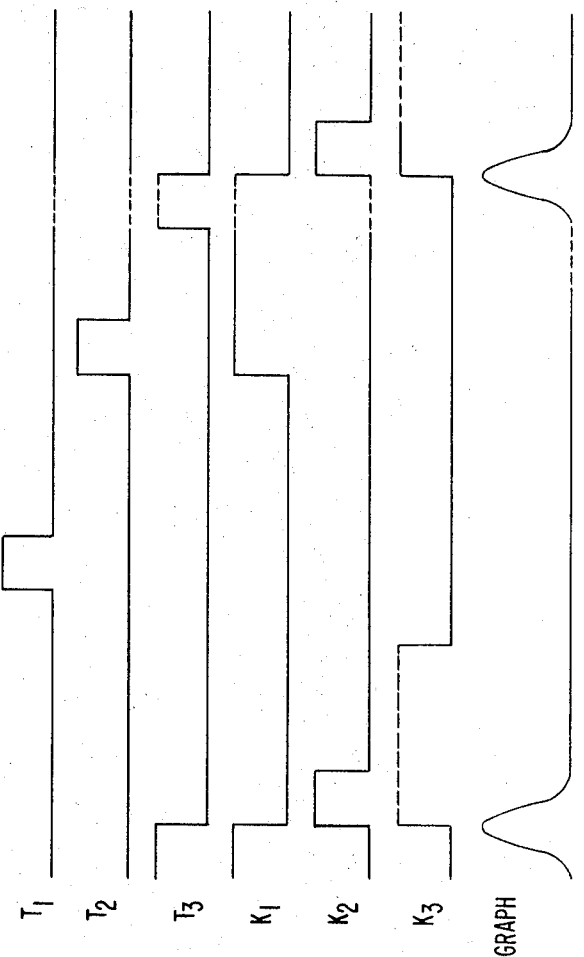
FIG. 4 is a timing and wave form diagram helpful in understanding the sequence of operation of the apparatus illustrated in FIGS. 1 through 3.

In considering the timing sequence as illustrated in FIG. 4, the upper levels in the timing switch wave forms $T_1$, $T_2$ and $T_3$ represent the times at which the switch arms are connected to the respective lower stationary terminals. The latter occurs when the corresponding follower is in the notch of the associated cam member. In the timing wave forms representing the relays $K_1$ through $K_3$ the upper level represents the time during which the respective relay is energized. Thus, at the assumed start time, the motor is not operating, relay $K_1$ is energized and the commutating capacitor 46 is connected to terminals 56 and 58 to receive the voltage from the retransmitting slide wires. When the chromatograph peak is detected, relay $K_2$ is energized causing switch arm 92 to engage the lower stationary terminal thereby deenergizing relay $K_1$. Relay $K_3$ is also energized for a time inversely proportional to the peak amplitude and operates to close switch arm 93 with the associated lower terminal to energize the solenoid coil 26.

When relay $K_1$ deenergizes, switch 90 connects the timing motor coil 74 to the power supply input terminals thereby starting the operation of the timing motor and causing the rotatable cam members 78, 80 and 82 to rotate clockwise. As a result of the rotation of the cam members, follower 88 first moves out of the notch of cam member 82 thereby providing an additional connection between the power supply and the timing motor coil 74. Next, follower 84 falls into the notch of cam member 78 thereby energizing the sample solenoid 22 which operates to inject a gas sample from the reactor into the chromatograph. This gas sample is the one which will provide the subsequent chromatograph peak. Next, follower 86 drops into the notch of cam member 80 thereby causing timing switch $T_2$ to reconnect relay $K_1$ to the power supply. When relay $K_1$ becomes energized, switch arm 90 moves back to the lower stationary terminal thereby latching on relay K₁. Finally, follower 88 drops into the notch of cam member 82 thereby stopping the rotation of the timing motor by disconnecting coil 74 from the power supply. When the new peak of the injected sample is detected the late latter sequence is repeated.

While the invention has been particularly shown and described with reference to preferred embodiments thereof, it will be understood by those skilled in the art that various changes in form and details may be made therein without departing from the spirit and scope of the invention.

I claim:

1. A control system responsive to samples of the contents within a chamber for controlling the entry of a specific fluid into said chamber comprising:
   a. chromatograph means responsive to said sample for generating a voltage waveform having a peak proportional to the amount of said fluid in said sample;
   b. means responsive to said voltage waveform and a predetermined reference voltage for storing a voltage which is inversely proportional to said peak voltage;
   c. means having an input terminal, responsive to the magnitude of said stored voltage being applied to said input terminal for converting said voltage magnitude into a pulse of current having a duration proportional to said amplitude; and
   d. means responsive to said current for passing said specific fluid to said chamber.

2. A control system as claimed in claim 1 wherein said means for converting comprises;
   a. a circuit including two controllable electronic valve means each capable of being alternately conductive while the other is nonconductive, said stored voltage being connected to the control input of said first electronic valve means for turning off said first valve and turning on said second valve when said stored voltage has a predetermined polarity and a magnitude greater than a predetermined magnitude;
   b. means for substantially linearly reducing the magnitude of said store voltage, whereby said second electronic valve means conducts current until said predetermined minimum magnitude is reached; and
   c. current amplifying means for amplifying a portion of the current conducted by said second electronic valve means.

3. A control system as claimed in claim 1 wherein said means for storing comprises:
   a. first circuit means responsive to said voltage waveform for generating a first switch controlling current when said voltage peak occurs;
   b. a storage capacitor switchably connected to the input of said means for converting, and a pair of terminals, said first terminal being connected to receive said voltage waveform and said second terminal being connected to said reference voltage;
   c. switch means responsive to said first switch controlling current for connecting said capacitor to the input of said means for converting; and
   d. timing means responsive to and initiated by said first switch controlling current for connecting said capacitor to said pair of terminals a predetermined time following the initiation of said timing means.

4. A control system as claimed in claim 3 wherein said means for converting comprises:
   a. a circuit including two controllable electronic valve means each being capable of being alternately conductive while the other is nonconductive, the input to said means for converting being connected to the control input of said first electronic valve means for turning off said first valve and turning on said second valve when said storage capacitor is connected to said input and the stored voltage has a predetermined polarity and is above a predetermined minimum magnitude;
   b. means connected to said input terminal for substantially linearly discharging said storage capacitor when connected to said input terminal, whereby said second electronic valve means conducts current until the voltage on said storage capacitor goes below said predetermined minimum magnitude; and
   c. current amplifying means for amplifying a portion of said current conducted by said electronic valve means.

5. A control system as claimed in claim 3 wherein said means for converting comprises:
   a. a plurality of switchably selectable capacitor discharge means for substantially linearly discharging said storage capacitor when connected to said input terminal;
   b. a first field effect transistor having a control electrode for controlling current through said first transistor, said control electrode being connected to said input terminal to render said first transistor conductive when the voltage at said input terminal has a predetermined polarity and is above a predetermined minimum magnitude;
   c. a second field effect transistor, having a control electrode for controlling current through said second transistor, said control electrode being connected to said first transistor to render said second transistor conducting when said first transistor is nonconducting and vice versa; and,
   d. transistor amplifying means for amplifying a portion of said current conducted by said second transistor thereby forming a pulse of current having a time duration proportional to the magnitude of said stored voltage.

6. A control system as claimed in claim 4 wherein said first circuit means comprises:
   a. an input terminal connected to said output voltage waveform generated by said chromatograph means;
   b. a second capacitor;
   c. asymmetrically conducting means connected between said input terminal and said capacitor for substantially transferring said voltage waveform to said capacitor during the increasing magnitude portion of said input waveform;
   d. a normally nonconductive electronic valve means connected to said input terminal and said second capacitor for conducting current in response to the voltage magnitude on said capacitor exceeding the magnitude of said voltage waveform; and
   e. current amplifying means, connected to said valve means, for amplifying said latter current thereby forming said switch controlling current.

7. A control system as claimed in claim 6 wherein said switch means comprises:
   a. a first coil;
   b. a double-pole double-throw switch connected to said storage capacitor and responsive to the energization of said first coil for connecting said storage capacitor to said pair of terminals, and responsive to the nonenergization of said first coil for connecting said storage capacitor to said input of said means for converting;
   c. a second coil connected to said first circuit to be energized by said switch controlling current;
   d. a pair of power supply terminals; and
   e. a normally closed relay controlled switch, connected in series with said power supply terminals and said first coil, responsive to the energization of said second coil for opening and disconnecting said first coil from said power supply.

8. A control system as claimed in claim 7 wherein said timing means comprises:
   a. a timer motor and a timer motor energizing coil for operating said motor when energized;
   b. latching switch means normally connecting said motor energizing coil in series with said power supply terminals, responsive to the energization of said first coil for disconnecting said energizing coil from said power supply terminals and latching said first coil in series with said power supply terminals; and c. means responsive to the operation of said motor for sequentially closing and opening a circuit path between said power supply terminals and said first coil, and disconnecting said motor energizing coil from said power supply terminals.

9. A control system as claimed in claim 8 wherein said first and second electronic valve means are field effect transistors.

UNITED STATES PATENT OFFICE
CERTIFICATE OF CORRECTION

Patent No. 3,550,608    Dated Dec. 29, 1970

Inventor(s) Irvin D. Johnson

It is certified that error appears in the above-identified patent and that said Letters Patent are hereby corrected as shown below:

Col. 1, line 40:   "provide" should read: --provided--

Col. 1, line 49:   "peak" omitted should read: --if the peak amplitude--

Col. 5, line 38:   "minimum" omitted should read: --predetermined minimum magnitude;--

Signed and sealed this 8th day of June 1971.

(SEAL)
Attest:

EDWARD M. FLETCHER, JR.
Attesting Officer

WILLIAM E. SCHUYLER, JR.
Commissioner of Patents